(12) United States Patent
Cano et al.

(10) Patent No.: US 10,647,256 B2
(45) Date of Patent: May 12, 2020

(54) METHOD FOR PROVIDING A REAR MIRROR VIEW OF A SURROUNDINGS OF A VEHICLE

(71) Applicant: Robert Bosch GmbH, Stuttgart (DE)

(72) Inventors: Raphael Cano, Stuttgart (DE);
Aleksandra Mitrovic, Villanova, PA (US); Milica Vujicic, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/333,038

(22) PCT Filed: Jul. 14, 2017

(86) PCT No.: PCT/EP2017/067808
§ 371 (c)(1),
(2) Date: Mar. 13, 2019

(87) PCT Pub. No.: WO2018/050315
PCT Pub. Date: Mar. 22, 2018

(65) Prior Publication Data
US 2019/0202356 A1 Jul. 4, 2019

(30) Foreign Application Priority Data
Sep. 14, 2016 (DE) .......................... 10 2016 217 488

(51) Int. Cl.
*B60R 1/00* (2006.01)
*G06T 3/00* (2006.01)
(Continued)

(52) U.S. Cl.
CPC .............. *B60R 1/00* (2013.01); *G06T 3/0062* (2013.01); *G06T 15/20* (2013.01);
(Continued)

(58) Field of Classification Search
CPC . B60R 1/00; B60R 2300/10; B60R 2300/105; B60R 2300/205;
(Continued)

(56) References Cited

U.S. PATENT DOCUMENTS 7,161,616 B1 * 1/2007 Okamoto .................. B60R 1/00
348/148
2004/0260469 A1 12/2004 Mizusawa
(Continued)

FOREIGN PATENT DOCUMENTS

DE       102014201801 A1   8/2015
JP       2007158426 A      6/2007
(Continued)

OTHER PUBLICATIONS

International Search Report for PCT/EP2017/067808, dated Sep. 21, 2017.

*Primary Examiner* — John R Schnurr
(74) *Attorney, Agent, or Firm* — Norton Rose Fulbright US LLP; Gerard Messina (57) ABSTRACT

A method for providing a rear mirror view of a surroundings of a vehicle includes capturing at least one portion of the vehicle surroundings in a first image by at least one wide-angle camera that is mounted on the vehicle, computing a second image (20) on the basis of the first image; the second image corresponding to an imaged field of view of a first virtual camera that is located in a first position in the vehicle surroundings and imaging an area located behind the vehicle in the vehicle surroundings, and providing the second image for displaying a rear mirror view.

10 Claims, 5 Drawing Sheets

(51) Int. Cl.
*G06T 15/20* (2011.01)
*H04N 5/232* (2006.01)
*H04N 5/262* (2006.01)
*H04N 5/272* (2006.01)

(52) U.S. Cl.
CPC ....... *H04N 5/23238* (2013.01); *H04N 5/2628* (2013.01); *H04N 5/272* (2013.01); *B60R 2300/10* (2013.01); *B60R 2300/105* (2013.01); *B60R 2300/205* (2013.01); *B60R 2300/306* (2013.01); *B60R 2300/307* (2013.01); *B60R 2300/60* (2013.01); *B60R 2300/602* (2013.01); *B60R 2300/605* (2013.01); *B60R 2300/8046* (2013.01); *B60R 2300/8066* (2013.01); *G06T 2210/62* (2013.01)

(58) Field of Classification Search
CPC ....... B60R 2300/306; B60R 2300/307; B60R 2300/60; B60R 2300/602; B60R 2300/605; B60R 2300/8046; B60R 2300/8066; G06T 3/0062; G06T 15/20; G06T 2210/62; H04N 5/23238; H04N 5/2628; H04N 5/272

See application file for complete search history.

(56) References Cited

U.S. PATENT DOCUMENTS

| | | | |
|---|---|---|---|
| 2008/0129756 | A1 | 6/2008 | Iwano |
| 2012/0069187 | A1* | 3/2012 | Ozaki ................ B60R 1/00 348/148 |
| 2013/0033602 | A1 | 2/2013 | Quast et al. |
| 2014/0347450 | A1 | 11/2014 | Han et al. |
| 2015/0097954 | A1 | 4/2015 | An et al. |

FOREIGN PATENT DOCUMENTS

| | | |
|---|---|---|
| JP | 2010137697 A | 6/2010 |
| JP | 2012065228 A | 3/2012 |
| JP | 2013191969 A | 9/2013 |
| JP | 2014068308 A | 4/2014 |
| JP | 2015015527 A | 1/2015 |

* cited by examiner

METHOD FOR PROVIDING A REAR MIRROR VIEW OF A SURROUNDINGS OF A VEHICLE

FIELD OF THE INVENTION

The present invention relates to a method for providing a rear mirror view of a surroundings of a vehicle.

BACKGROUND INFORMATION

An important factor today in designing new vehicles, is to keep the costs of manufacturing the vehicle low. It is also becoming increasingly important to enhance the energy efficiency of the vehicle during the operation thereof in order to meet environmental protection requirements. The result, for example, is that outside mirrors on the motor vehicle are eliminated by an especially aerodynamic design. Thus, an aerodynamic drag of a vehicle is increased by 2 to 7%, for example, by the outside mirrors.

To eliminate the need for an outside mirror, cameras, which are appropriately oriented for capturing the relevant area, are mounted on the vehicle. The image from these cameras is directly shown to the driver of a vehicle via a display.

SUMMARY

The method according to the present invention for providing a rear mirror view of a surroundings of a vehicle encompasses capturing at least one portion of the vehicle surroundings in a first image using at least one wide-angle camera that is mounted on the vehicle, computing a second image on the basis of the first image, the second image corresponding to an imaged field of view of a first virtual camera that is located in a first position in the vehicle surroundings and images an area located behind the vehicle in the vehicle surroundings, and encompasses providing the second image for a display of a rear mirror view.

The wide-angle camera is thereby, in particular, a camera of a surround view system. A wide-angle camera is a camera that is equipped with a wide-angle lens, thus a lens that, in particular has an aperture angle of more than 80 degrees. In particular, the wide-angle camera is a camera having a fisheye lens which has an aperture angle of more than 170 degrees. The virtual camera is not an actual camera, rather a camera whose image is ascertained computationally. If the first image is captured using a plurality of wide-angle cameras, then the individual images of the plurality of wide-angle cameras are assembled to form one single first image. This process is also referred to as stitching.

A rear mirror view is a view of a portion of the vehicle surroundings that is located behind the vehicle. Thus, the rear mirror view is a view that images objects located behind the vehicle. An area located behind the vehicle is an area that is located toward the rear end of the vehicle, as viewed from a position of the driver. Correspondingly, an area located in front of the vehicle is an area that is located toward the front end of the vehicle, as viewed from the point of view of the driver.

The second image includes a portion of the image information from the first image. In other words, this signifies that the second image does not include all image information from the first image, rather merely a selection thereof; the image information from the first image also being converted to compute the corresponding field of view of the first virtual camera. It is thus achieved, for example, that the cameras of a surround view system, which are often mounted in present-day vehicles anyway, may also be used for producing a rear mirror view. The use of wide-angle cameras is also advantageous for producing a rear mirror view since such cameras are able to be better integrated in a vehicle body; these cameras nevertheless being able to efficiently capture an area located behind the vehicle.

Since the second image is computed on the basis of the first image, thus the first image is not directly displayed as a rear mirror view for the driver of the vehicle, a greater flexibility is also achieved in a way that makes it possible to modify the rear mirror view without the need for altering the orientation of the camera, here the wide-angle camera disposed on the vehicle. The method according to the present invention is particularly advantageous since areas that are not visible in the view of a rear mirror, commonly known as the blind spot, are eliminated. A driving safety is thus enhanced. For the most part, current rear mirrors have an angle of approximately 17°. On the other hand, the proposed technology may significantly enlarge such a field of view.

The dependent claims recite preferred embodiments of the present invention.

It is thus advantageous when the first position and/or the field of view of the first virtual camera are/is variable and are/is selected, in particular on the basis of a state parameter of the vehicle. The state parameter of the vehicle is, in particular a speed, a selected driving direction and/or a steering angle of the vehicle. A rear mirror view may thereby be optimally adapted to a driving situation. Thus, the rear mirror view is automatically adapted so that, in each case, an area of the vehicle surroundings, that is of interest to the driver, is imaged very effectively. Thus, for example, a field of view of the first virtual camera could be increased or reduced in size with increasing speed of the vehicle. The field of view of the first virtual camera could also be shifted toward the vehicle base when a selected driving direction indicates a backing-up. The imaged field of view of the first virtual camera could also be shifted away from the vehicle when a sharp steering angle is recognized.

It is also advantageous when the first position and/or the field of view of the first virtual camera is selected on the basis of an input of a user.

A driver of the vehicle, for example, may thereby select the rear mirror view that he/she prefers.

A rear mirror view may thereby be adjusted, similarly to a conventional rear mirror. Moreover, it is advantageous when the field of view of the first virtual camera is selected to image at least one defined area of the vehicle surroundings. The defined region of the vehicle surroundings is thereby preferably a space that corresponds to a specified field of view of an outside mirror. In other words, the field of view of the first virtual camera is limited in the modification thereof to ensure that at least one specific area of the vehicle surroundings, which extends in a specific location relative to the vehicle, is imaged. A specified field of view of the outside mirror is, in particular a field of view that is predefined by regulations. An exemplary regulation is the United Nations Convention on equipping vehicles (for example, Regulation no. 46 of the E/ECE/324/REV.1/ ADD.45/). It is thereby ensured that the rear mirror view provided corresponds to the road safety requirements at every point in time. This was not possible using conventional mirror systems since a conventional rear mirror view was not only actually dependent on the position of the mirror, rather also on the head position of the driver.

It is also advantageous when the second image is provided by a head-up display of the vehicle and/or by a monitor in the interior of the same. In particular, the monitor is mounted in the vehicle interior in the area of the A-pillar thereof. This makes it possible to simulate a conventional rear mirror, with whose use potential drivers of the vehicle are already familiar. It is likewise advantageous to show the rear mirror image via a head-up display of the vehicle since this eliminates the need for the driver to avert his/her eyes from the roadway. Nevertheless, the requirements placed on a rear mirror may still be fulfilled. The second image is optionally shown both by a head-up display of the vehicle, as well as by a monitor in the interior of the same. Two different second images, which are each based on different fields of view and/or first positions of the first virtual camera, are thereby optionally computed. Thus, for each display of the second image, an optimal rear mirror view may be ensured for a driver.

Moreover, it is advantageous when the first position of the first virtual camera is located ahead of a front end of the vehicle in the vehicle surroundings, and a transparent model of the vehicle is inserted into the second image. The surroundings of the vehicle are thereby set in relation to the vehicle itself. The driver of the vehicle is thus able to very effectively assess an approach of the vehicle to objects in the vehicle surroundings.

The method according to the present invention preferably includes computing an exterior view of the vehicle, the vehicle surroundings being displayed using the image data of the first image, and the vehicle being displayed by a 3D model thereof, the second image being displayed as a mirror surface of the outside mirror of the 3D model. A picture-in-picture technique is thus implemented. The exterior view of the vehicle may be provided for the driver, this exterior view not being subject to the limitations of a rear mirror view, rather it also being possible to display an area ahead of the vehicle. This is particularly helpful when maneuvering the vehicle. However, since the second image is likewise displayed in the exterior view of the vehicle at a location of the 3D model of the vehicle, it is still ensured that the driver is also keeping an area behind the vehicle in view. At the same time, a very realistic imaging of the exterior view of the vehicle is rendered possible.

Moreover, it is advantageous when the second image is computed on the basis of the first image by computing the second image using a cylindrical correction from the first image. This may be achieved using a coordinate transformation, for example. This makes it possible to produce the second image very rapidly with minimal computational outlay. This is advantageous since there is thereby only a slight time delay between the capturing of the first image and the calculation and provision of the second image. It is thus ensured that an instantaneous rear mirror view is provided to the driver.

Moreover, it is advantageous when computing the second image on the basis of the first image also includes the steps of: transmitting the first image to a virtual projection surface in a virtual space that represents the vehicle surroundings; the virtual projection surface at least partially encircling a position that corresponds to a location of the vehicle in the virtual space; and the first image being transmitted to the virtual projection surface in such a way that objects, which are pictured in the first image, are imaged onto the virtual projection surface in correspondence with the location thereof in the vehicle surroundings; and placing the first virtual camera in the virtual space, and the first virtual camera capturing the second image; a field of view of the first virtual camera being selected in such a way that it images an area of the virtual projection surface located behind the vehicle in the vehicle surroundings. The virtual space is thereby a mathematical construct which represents the vehicle surroundings. Thus, each point in the virtual space may have a point in the vehicle surroundings assigned thereto. The virtual projection surface is disposed, respectively defined in the virtual space in such a way that it at least partially encircles a position that corresponds to a location of the vehicle in the virtual space. Since the virtual space represents the actual vehicle surroundings, there is likewise an area in the virtual space that corresponds to the vehicle in the vehicle surroundings. This area is at least partially encircled by the projection surface. Thus, the projection surface may have the shape of a basin, for example; the area of the virtual space, which corresponds to the vehicle, being located within the basin. The first image is transmitted to the projection surface. It is thereby especially advantageous when a plurality of wide-angle cameras are mounted on the vehicle to jointly capture the first image, in order that the first image represent the largest possible area of the vehicle surroundings, and when the widest possible areas of the virtual projection surface are used to display the first image. It is also advantageous to use further sensors, respectively distance sensors to scan the vehicle surroundings to image objects, which are pictured in the first image, in the vehicle surroundings on the virtual projection surface in correspondence with the location thereof in the vehicle surroundings. The first virtual camera is disposed in the virtual space. The first virtual camera is thereby preferably disposed in the virtual space in such a way that the position thereof is likewise at least partially encircled by the virtual projection surface. The field of view of the first virtual camera is selected in such a way that it images an area of the virtual projection surface located behind the vehicle in the vehicle surroundings. In this regard, an optical axis of the first virtual camera is oriented to be rearwardly directed along a longitudinal axis of the vehicle and not deviate more than 90 degrees therefrom. Thus, a substantial flexibility is attained by selecting the first position of the first virtual camera. Thus, the rear mirror view may be adapted very effectively to the needs of a driver.

A device, which is adapted for implementing the inventive method, has all the advantages of the method according to the present invention. In particular, such a device is a surround view system. Since such a surround view system already has the requisite computing capacity and likewise the requisite cameras, the need is thus eliminated for additional hardware.

BRIEF DESCRIPTION OF THE DRAWINGS

Exemplary embodiments of the present invention are described in detail in the following with reference to the accompanying drawing. In the drawing.

DETAILED DESCRIPTION

Figure 1:
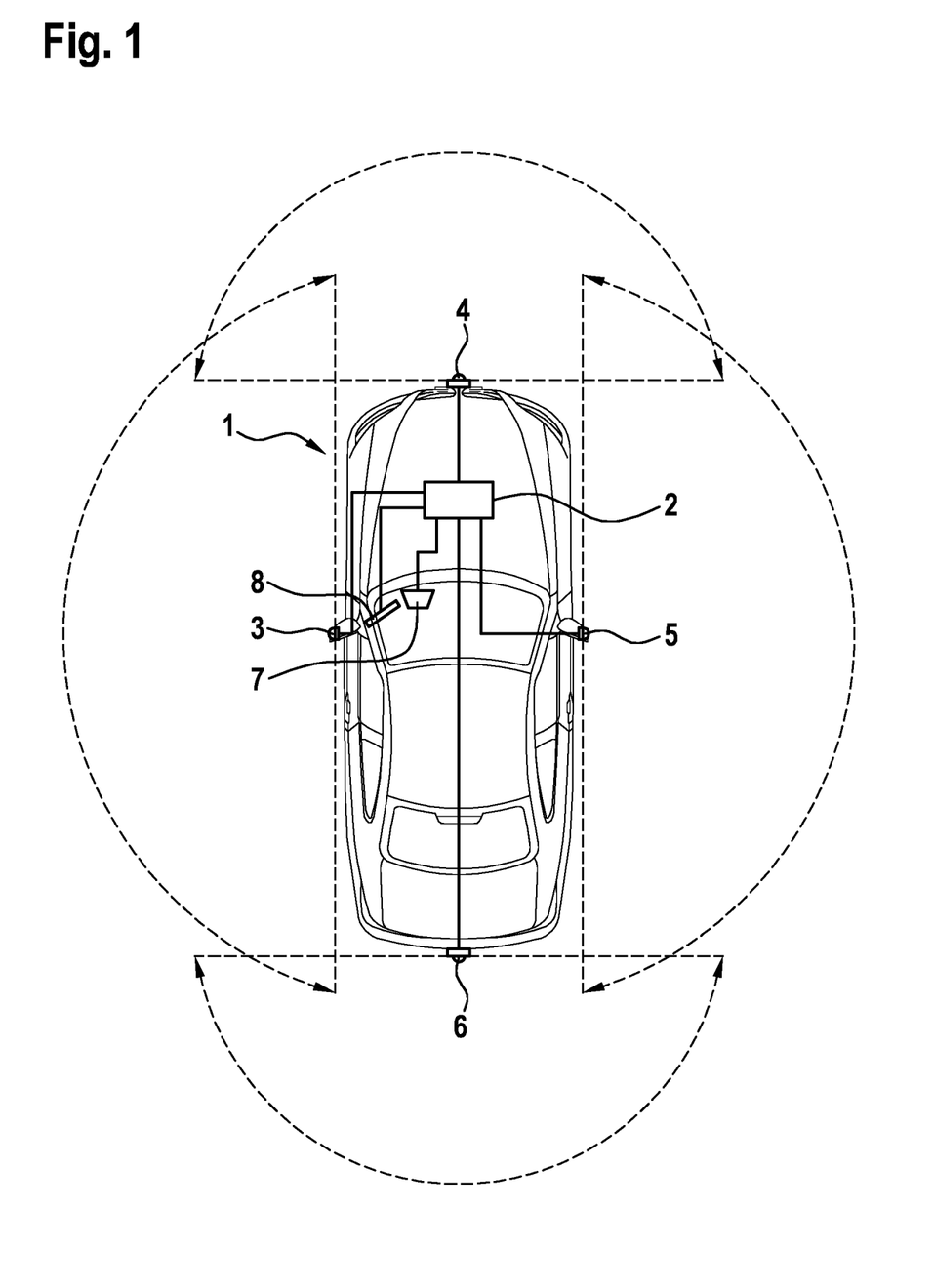
FIG. 1 is a vehicle having a device for providing a rear mirror view of a surroundings of the vehicle in accordance with a first specific embodiment of the present invention.

FIG. 1 shows a vehicle 1 that includes a device 2 for providing a rear mirror view of a surroundings of vehicle 1. Device 2 is thereby a processing unit. Video inputs and video outputs are provided on device 2.

Connected to video inputs of device 2 in this first specific embodiment of the present invention are a first camera 3, a second camera 4, a third camera 5, and a fourth camera 6. First camera 3 is located on a left side of vehicle 1 and captures an area of the vehicle surroundings to the left, next to vehicle 1. Second camera 4 is located at a front end of vehicle 1 and captures an area of the vehicle surroundings ahead of vehicle 1. Third camera 5 is located on a right side of vehicle 1 and captures an area of the vehicle surroundings to the right, next to vehicle 1. Fourth camera 6 is located at a rear end of vehicle 1 and captures an area of the vehicle surroundings behind vehicle 1. First camera 3 and third camera 5 are each secured to mounting fixtures that are located on vehicle 1, respectively, in the place of a rear mirror. These mounting fixtures may optionally actually include a conventional rear mirror. First through fourth cameras 3 through 6 are each equipped with a wide-angle lens in the form of a fisheye lens that has an aperture angle of 180 degrees. The areas of the vehicle surroundings captured by first through fourth cameras 3 through 6, overlap. Thus, both first camera 3, as well as fourth camera 6 capture an area, for example, that is located to the left, behind vehicle 1.

A head-up display 7 and a monitor 8 are connected to the video outputs of device 2. Monitor 8 is thereby located in the area of the right A-pillar of vehicle 1. Monitor 8 is thereby positioned in a way that facilitates the viewing thereof by a driver of vehicle 1.

Device 2 realizes a method for providing a rear mirror view of a surroundings of vehicle 1.

Figure 2:
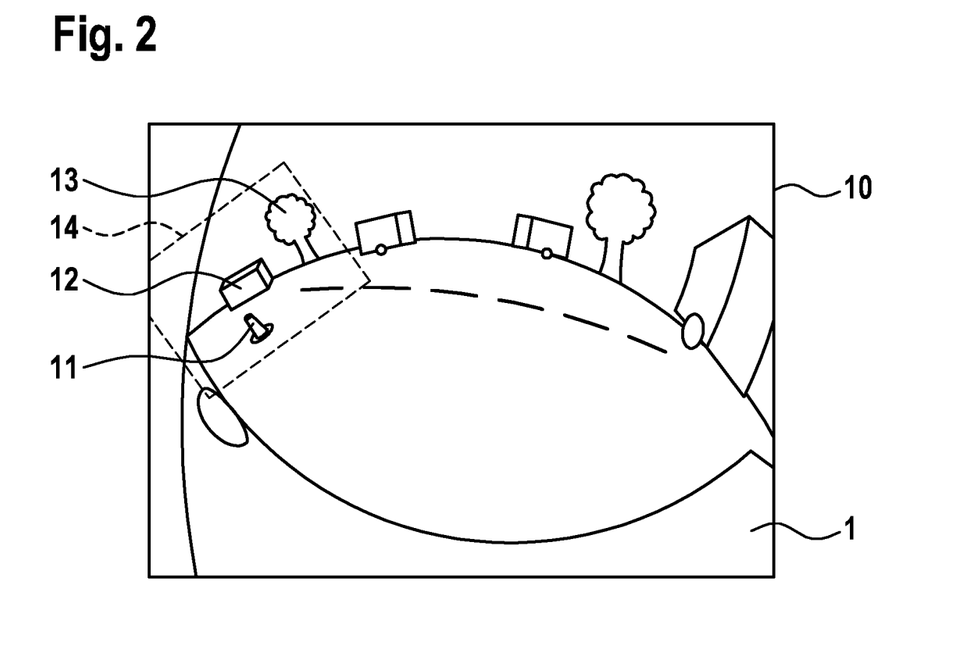
FIG. 2 is an exemplary first image captured using a wide-angle camera.

In a first method step, at least one wide-angle camera mounted on vehicle 1 captures at least one portion of the vehicle surroundings in a first image 10. In this first specific embodiment of the present invention, the at least one wide-angle camera is first camera 3. First camera 3 captures first image 10. Since first camera 3 is equipped with a wide-angle lens, first image 10 is a distorted representation of the vehicle surroundings. Due to the large aperture area of first camera 3, portions of vehicle 1 are visible in first image 10. In the area of first image 10 located to the left in FIG. 2, a partial area 14 is also visible, which forms an image of an area of the vehicle surroundings located behind vehicle 1. An area, which is located in front of vehicle 1 in the vehicle surroundings, is also visible in the area of first image 10 shown to the right in FIG. 2. A plurality of objects are located behind vehicle 1 in first image 10 shown in FIG. 2. Thus, a traffic cone 11, a box 12, and a tree 13 are located behind vehicle 1 in the vehicle surroundings. Partial area 14 is a partial area of first image 10.

Since first camera 3 is located on the left side of vehicle 1 and captures an area of the vehicle surroundings to the left, next to vehicle 1, a left rear mirror view is exemplarily computed and provided in this first specific embodiment. Thus, a right rear mirror view may be computed correspondingly when third camera 5 alternatively or additionally captures the first image.

In this first specific embodiment, first image 10 is captured only by one single wide-angle camera, namely first camera 3. In alternative specific embodiments, a plurality of wide-angle cameras capture first image 10. Thus, the first image is captured by first through fourth cameras 3 through 6, for example. To that end, the step of capturing at least one portion of the vehicle surroundings includes an additional step of joining together the individual images of first through fourth cameras 3 through 6. In accordance with the present invention, first image 10 may be assembled from any number of images from wide-angle cameras mounted in any desired manner, as long as at least one of the wide-angle cameras captures an area located behind vehicle 1 in the vehicle surroundings.

Once first image 10 is captured in the first step of the method; second image 20 is computed in a second step on the basis of first image 10; second image 20 corresponding to an imaged field of view of a first virtual camera that is located in a first position in the vehicle surroundings and images partial area 14 located behind vehicle 1 in the vehicle surroundings. Second image 20 is formed exemplarily in FIG. 3. Second image 20 is thereby computed on the basis of exemplary first image 10 shown in FIG. 2. Thus, objects, which are imaged in partial area 14, are likewise displayed in second image 20. Thus, second image 20 likewise shows traffic cone 11, box 12, and tree 13. However, the objects displayed in second image 20 are not distorted, as was still the case in first image 10.

Figure 3:
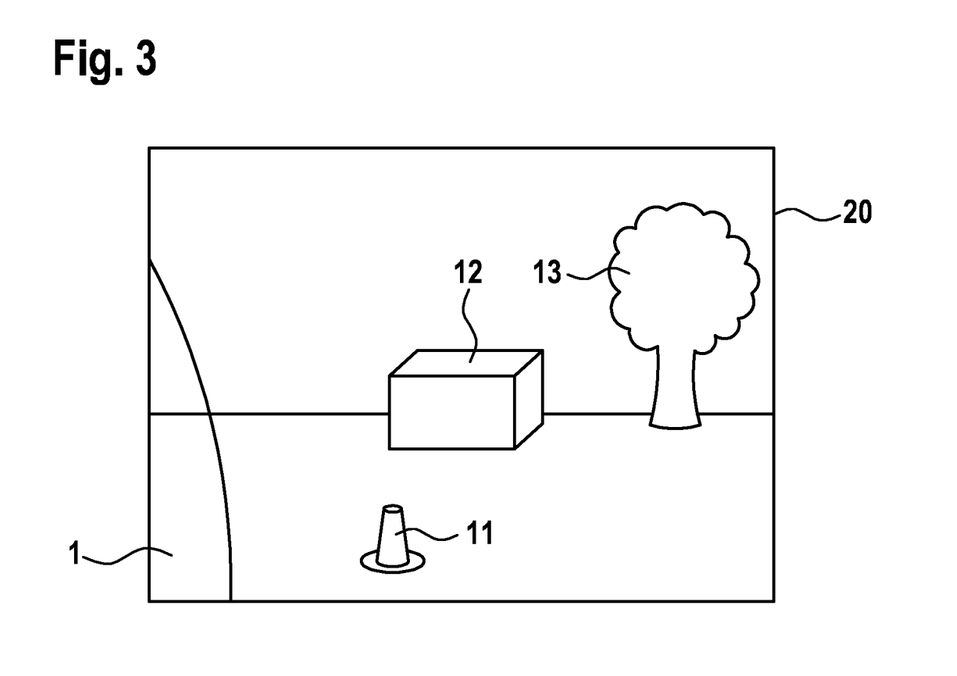
FIG. 3 is an exemplary second image computed in accordance with the first specific embodiment of the present invention on the basis of the first image.

In this first specific embodiment, the first position of the first virtual camera corresponds to the position of first camera 3. However, the field of view imaged by the first virtual camera is smaller than a field of view of first camera 3. The first virtual camera does not have the properties of a wide-angle camera. Thus, second image 20 does not have the distortions of first image 10.

Second image 20 may be computed in different ways. Thus, second image 20 is computed, for example, by performing a cylindrical correction of first image 10. The calculation parameters required therefor are derived from the properties of the lenses of first through fourth cameras 3 through 6 and may be factory-preset for device 2. It is especially preferred that second image 20 be computed on the basis of a coordinate transformation. Each image point of second image 20 is thereby assigned a corresponding image of first image 10. The image information of second image 20 is extracted image point for image point from first image 10. The assignment of the image points may be calculated in advance by the cylindrical correction.

In an alternative procedure for computing second image 20, first image 10 is initially transmitted to a virtual projection surface in a virtual space that represents the vehicle surroundings. The virtual space is thereby a mathematical construct. The virtual space represents the vehicle surroundings. Thus, each point in the virtual space is assigned a point in the vehicle surroundings. The virtual projection surface thereby at least partially encircles a position that corresponds to a location of vehicle 1 in the virtual space. Since every point in the virtual space is assigned a point in the vehicle surroundings, vehicle 1 is represented by a volume element in the virtual space. In this specific embodiment, this volume element is encircled by the projection surface. In this first specific embodiment, the virtual projection surface has the exemplary shape of a basin. A bottom of the basin thereby corresponds in the vehicle surroundings to a roadway surface on which vehicle 1 is located. A wall of the basin encircles the volumetric region of the virtual space which corresponds to vehicle 1. First image 10 is transmitted to the inner wall of the basin, thus to the virtual projection surface. If first image 10 is captured only by first camera 3, only a partial area of the projection surface is textured with image information. If first image 10 is captured by a plurality of wide-angle cameras, for example, by first through fourth cameras 3 through 6, the projection surface may virtually be completely textured.

The first image is transmitted to the virtual projection surface in such a way that objects, which are pictured in first image 10, are imaged onto the virtual projection surface in correspondence with the location thereof in the vehicle surroundings. Thus, objects, which are located in front of vehicle 1 in the vehicle surroundings, are also located on the virtual projection surface in front of vehicle 1. Objects, which are located behind vehicle 1 in the vehicle surroundings, are also located on the virtual projection surface in an area behind the vehicle. The virtual camera is disposed in the virtual space. Thus, a virtual three dimensional space is computed, within which the first virtual camera is located. The first virtual camera is thereby oriented to capture an area of the virtual projection surface located at least in sections thereof behind vehicle 1 that is transmitted into the virtual space. Thus, an image from the first virtual camera shows first image 10 placed on virtual projection surface.

The first virtual camera is thereby oriented to image an area of the virtual projection surface located behind vehicle 1 in the vehicle surroundings. This is accomplished by appropriately selecting an optical axis of the virtual camera that, starting from the position of the virtual camera, is directed along a longitudinal axis of vehicle 1 toward the vehicle rear end and does not deviate by more than 90 degrees therefrom. The field of view of the first virtual camera is thereby selected to image an area of the virtual projection surface located behind vehicle 1 in the vehicle surroundings. The image from the first virtual camera corresponds to second image 20.

The position and/or the field of view of the first virtual camera may be variably selected independently of how second image 20 is computed. A field of view of the virtual camera may be automatically modified as a function of an engaged gear. If the gear is shifted to reverse, a parking maneuver at a low speed is indicated, the field of view of the virtual camera being moved downwards. Thus, for example, partial area 14 imaged in FIG. 2, which is located behind vehicle 1 in the vehicle surroundings, may be variably selected. Thus, it may be selected, for example, to be larger or smaller or may be shifted horizontally or vertically. The field of view of the first virtual camera is thereby modified. This is accomplished, in particular on the basis of a state parameter of vehicle 1. Thus, for example, a speed of vehicle 1, a travel direction of vehicle 1, and/or a steering angle of vehicle 1 are recorded. These values may be queried, for example, by a control electronics of vehicle 1. Thus, for example, a field of view of the first virtual camera and thus partial area 14 are reduced in size when the speed of vehicle 1 exceeds a certain threshold value. Far away objects, which are more relevant for the driver in a turnpike ride than in the case of a parking of the vehicle, are thereby enlarged. In the case of a sharp steering angle of motor vehicle 1 to the left, the field of view of the first virtual camera could also be shifted to the right or left. This shift to the right or left could be selected in a way that keeps another vehicle driving behind vehicle 1 visible in a rear mirror view, thus in second image 20, in the case of a cornering, even when vehicle 11 turns about the vertical axis thereof due to a curve. The field of view of the first virtual camera could optionally be shifted toward a roadway surface when a gear is put in reverse, thus the selected driving direction is rearward, whereby a curb would be readily visible to a driver of vehicle 1 when he/she maneuvers vehicle 1 into a parking space.

Alternatively or additionally, the first position and/or the field of view of the first virtual camera, may be selected on the basis of an input of a user. Thus, for example, located on an instrument panel of vehicle 1 is an operating device that a driver of vehicle 1 may use to arbitrarily adjust the area of the vehicle surroundings depicted by second image 20.

The position of the first virtual camera may also be optionally selected, both when the position and/or the field of view of the virtual camera is selected on the basis of a state parameter, as well as when the selection is made on the basis of an input of a user. Thus, for example, the first virtual camera could be moved downwards in the virtual space. This is especially helpful for clearly imaging a curb during a parking operation of vehicle 1. In a turnpike ride, the first virtual camera could be moved upwards in the virtual space to be able to more clearly recognize vehicles that are further away. Moving the first virtual camera along a longitudinal axis of the vehicle or along a transversal axis of the vehicle may also lead to an advantageous representation of the vehicle surroundings.

Figure 4:
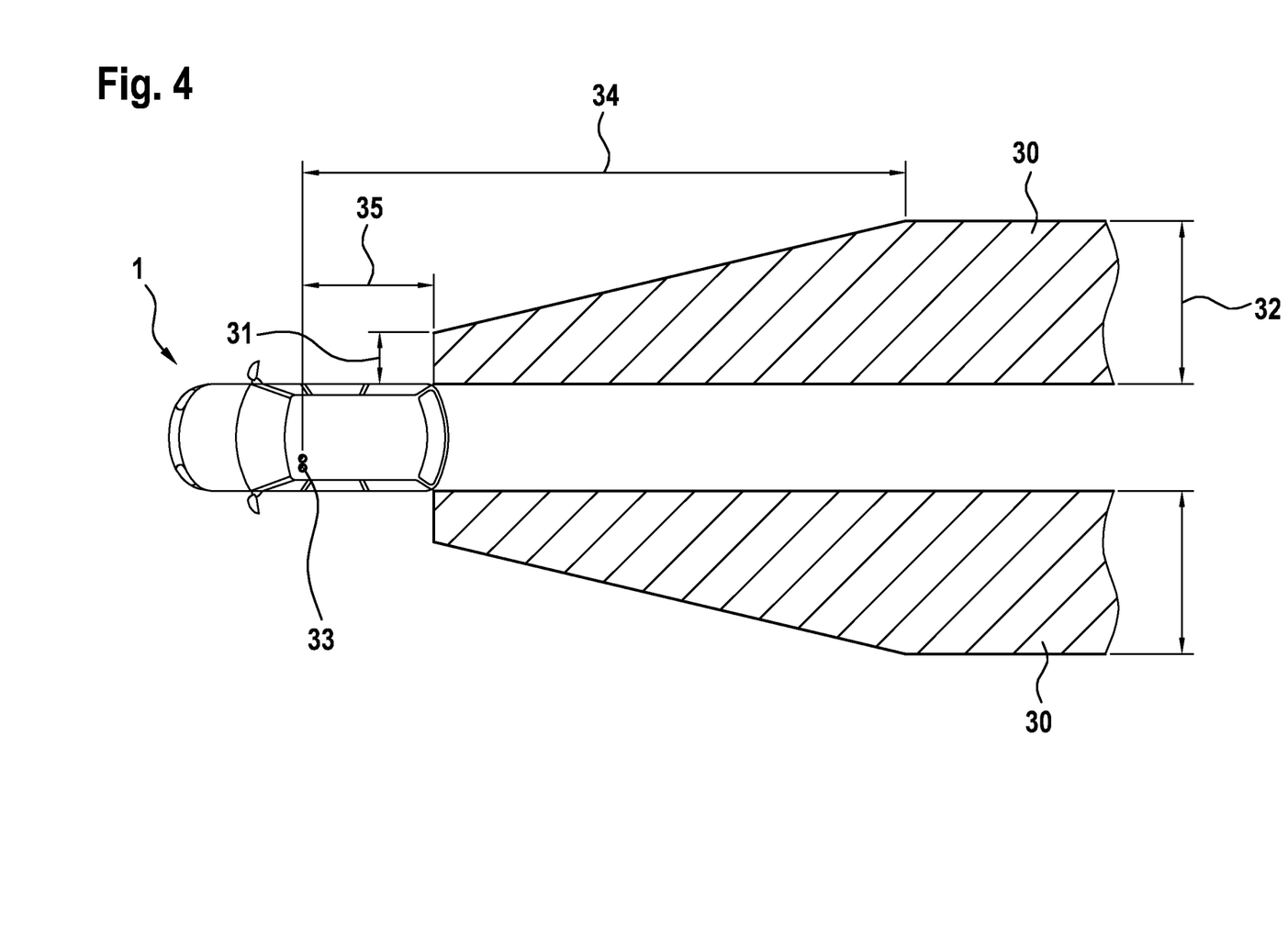
FIG. 4 is an exemplary representation of a predefined area of the vehicle surroundings in accordance with the first specific embodiment of the present invention.

It is optionally thereby monitored that the field of view of the first virtual camera is selected at all times to image at least one predefined area 30 of the vehicle surroundings. This predefined area 30 of the vehicle surroundings is preset at the factory, for example. It is thereby ensured that a legally prescribed rear mirror view is available to vehicle 1 at all times. In this regard, FIG. 4 shows an exemplary representation of a predefined area 30 of the vehicle surroundings in accordance with the first specific embodiment of the present invention. Predefined area 30 extends behind the rear end of vehicle 1. Predefined area 30 thereby widens on each side of the vehicle, starting from a first width 31 (for example, 1 meter) to a second width 32. The second width is thereby reached following a first distance 34 (for example, 20 meters) behind a viewing position 33 of the driver of vehicle 1. The rear end of the vehicle is behind this viewing position 33 by a second distance 35 (for example, four meters).

FIG. 4 is an exemplary representation of a legal requirement for the field of view of a rear mirror. Predefined area 30 may be selected by positioning test objects behind vehicle 1 in accordance with legal requirements, and second image 20 is computed by selecting partial area 14 in such a way that these test objects are visible. Second image 20 may deviate from an actual rear mirror view of a conventional rear mirror in such a way that it even displays what is generally referred to as the blind spot. Once second image 20 is computed, a following method step provides for displaying a rear mirror view. To that end, in this first specific embodiment, second image 20 is provided via the video output of device 2 and displayed via monitor 8.

In addition, second image 20 is shown to the driver of vehicle 1 via head-up display 7 when a state parameter of the vehicle is fulfilled. Thus, in this first specific embodiment, second image is always shown via head-up display of vehicle 1 when a change in direction is indicated by actuation of the blinker of vehicle 1, and or when a steering angle of vehicle 1 is recognized.

It is readily apparent that the previously mentioned method may be used both to produce an image for a rear mirror view of a left mirror, as well as a corresponding rear mirror view of a right mirror.

Similarly, however, completely new rear mirror views may be generated using the previously mentioned techniques. Thus, in a second specific embodiment of the present invention, the first position of the first virtual camera is selected to be located ahead of the front of vehicle 1 in the vehicle surroundings. The first virtual camera is positioned in the virtual space in front of vehicle 1. However, an equivalent image may also be produced without computationally depicting the virtual space using a coordinate transformation when the images of the first through third cameras 3 through 5 are joined together.

Figure 5:
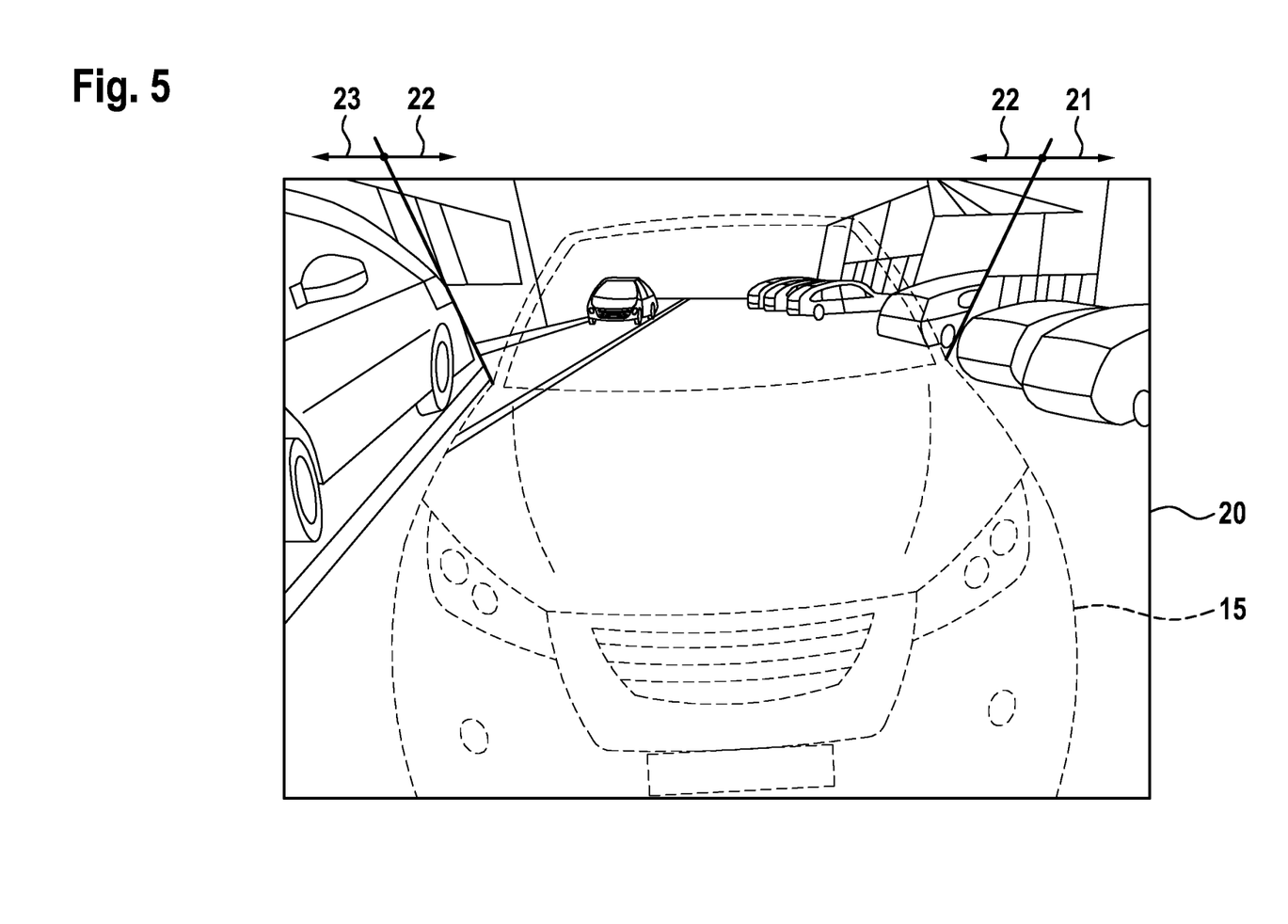
FIG. 5 is an exemplary second image computed on the basis of the first image in accordance with a second specific embodiment of the present invention.

A transparent model 15 of vehicle 1 is inserted into such an image from the first virtual camera. Thus, transparent model 15 of vehicle 1 is inserted into second image 20. This is shown exemplarily in FIG. 5. Partial areas located in front of vehicle 1 may thereby be displayed by images captured by second camera 4. In other respects, second image 20 may be composed of images captured by first camera 3, third camera 5, and fourth camera 6. An image from first camera 3 thereby shows a first area 21; an image from fourth camera thereby shows a second area 22; and an image from third camera 5 thereby shows a third area 23. Transparent model 15 of vehicle 1 is centrally located in second image 20. Thus, a central rear mirror view is produced. In contrast to conventional rear mirror views, this is not specifically different for a left and a right side of vehicle 1. Thus, it is especially advantageous to depict such a central rear mirror view via head-up display 7. Alternatively, an additional central monitor inside of vehicle 1 may be used for displaying such a rear mirror view.

Figure 6:
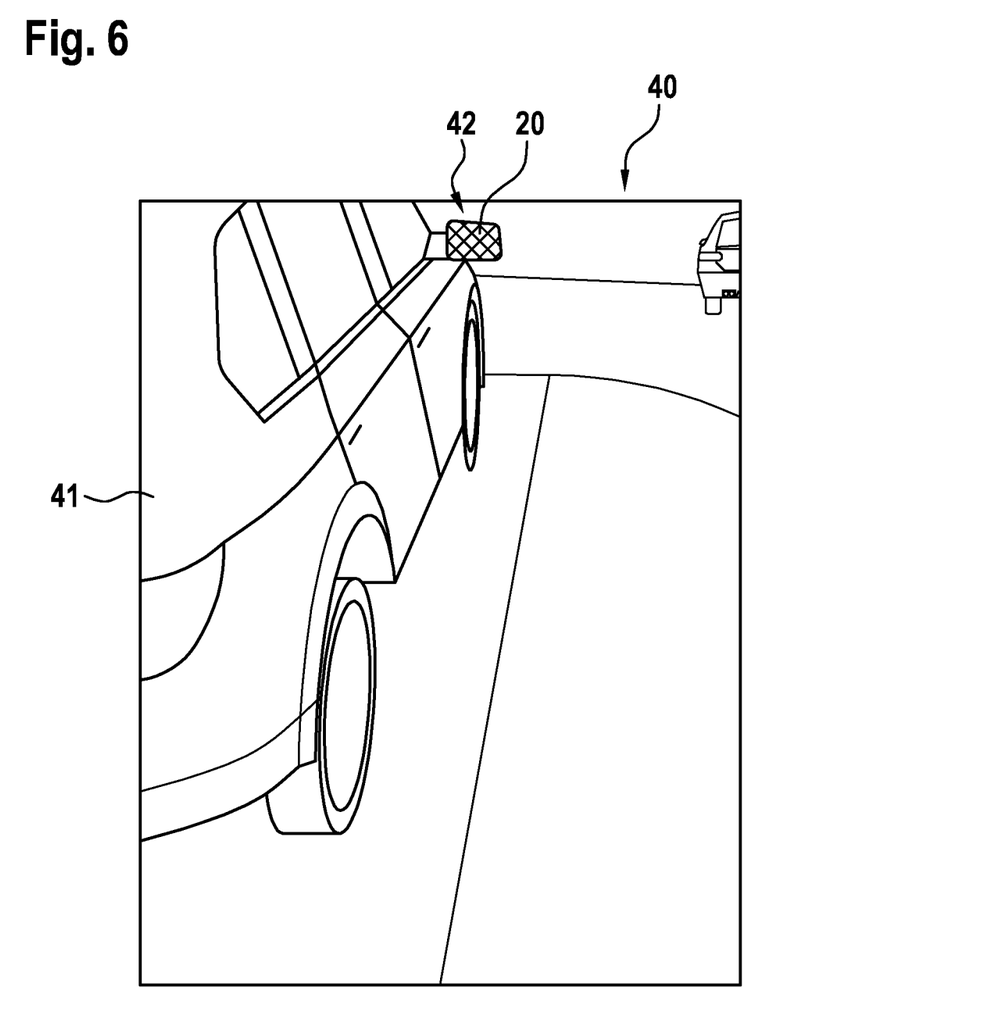
FIG. 6 is an exterior view of the vehicle computed in accordance with the present invention in accordance with a third specific embodiment of the present invention.

Alternatively, in a third specific embodiment of the present invention, an exterior view 40 of vehicle 1 is computed before second image 20 is provided, the image data of first image 10 displaying the vehicle surroundings, and a 3D model 41 of the vehicle displaying vehicle 1. Second image 20 is thereby displayed as a mirror surface of outside mirror 42 of 3D model 41. To that end, a second virtual camera and 3D model 41 of vehicle 1 are located in the virtual space. The field of view and the position of the second virtual camera are freely selectable and are not subject to the limitations of the first virtual camera. If a position and a field of view of the second virtual camera are selected in such a way that the mirror surface of outside mirror 42 of 3D model 41 falls into the field of view of the second virtual camera, then second image 20 is placed as a texture on the mirror surface of outside mirror 42 of 3D model 41. 3D model 41 of vehicle 1 may thereby deviate from a shape of actual vehicle 1, so that it may even include a rear mirror when vehicle 1 actually does not have one. A third image from the second virtual camera is captured and forms exterior view 40 of vehicle 1. Thus, in a partial area, this third image also shows second image 20. Second image 20 is provided for a display of a rear mirror view in that the third image, and thus the second image as well, are shown on monitor 8 in the passenger compartment or on head-up display 7 of vehicle 1.

Besides the above written disclosure, reference is explicitly made to the disclosure of FIG. 1 through 6.

What is claimed is:

1. A method for providing a rear mirror view of a surroundings of a vehicle, the method comprising:
   capturing at least one portion of the vehicle surroundings in a first image by at least one wide-angle camera located on the vehicle;
   computing a second image based on the first image, wherein the second image corresponds to an imaged field of view of a first virtual camera that is located in a first position in the vehicle surroundings and that images an area located behind the vehicle in the vehicle surroundings;
   providing the second image for displaying a rear mirror view;
   computing an exterior view of the vehicle;
   displaying the vehicle surroundings by image data of the first image; and
   displaying the vehicle by a 3D model of the vehicle, wherein the second image is displayed as a mirror surface of an outside mirror of the 3D model.

2. The method as recited in claim 1, wherein at least one of the first position and the field of view of the first virtual camera is at least one of variable and selected.

3. The method as recited in claim 1, wherein at least one of the first position and the field of view of the first virtual camera is at least one of variable and selected based on a state parameter of the vehicle.

4. The method as recited in claim 1, wherein at least one of the first position and the field of view of the first virtual camera is selected based on of an input of a user.

5. The method as recited in claim 1, wherein the field of view of the first virtual camera is selected to image at least one predefined region of the vehicle surroundings.

6. The method as recited in claim 1, wherein the second image is provided by at least one of a head-up display of the vehicle and a monitor in an interior of the vehicle.

7. The method as recited in claim 1, wherein the first position of the first virtual camera is located ahead of a front end of the vehicle in the vehicle surroundings, and wherein a transparent model of the vehicle is inserted into the second image.

8. The method as recited in claim 1, wherein the second image is computed based on the first image by computing the second image using a cylindrical correction from the first image.

9. The method as recited in claim 1, wherein the computing of the second image based on the first image includes:
   transmitting the first image to a virtual projection surface in a virtual space that represents the vehicle surroundings, the virtual projection surface at least partially encircling a position that corresponds to a location of the vehicle in the virtual space,
   transmitting the first image to the virtual projection surface so that an object pictured in the first image is imaged on the virtual projection surface in correspondence with a location of the object in the vehicle surroundings,
   placing the first virtual camera in the virtual space,
   capturing, by the first virtual camera, the second image, and
   selecting a field of view of the first virtual camera to image an area of the virtual projection surface located behind the vehicle in the vehicle surroundings.

10. An apparatus for providing a rear mirror view of a surroundings of a vehicle, comprising:
    a device configured to perform the following
       capturing at least one portion of the vehicle surroundings in a first image by at least one wide-angle camera located on the vehicle;
       computing a second image based on the first image, wherein the second image corresponds to an imaged field of view of a first virtual camera that is located in a first position in the vehicle surroundings and that images an area located behind the vehicle in the vehicle surroundings;

providing the second image for displaying a rear mirror view,
computing an exterior view of the vehicle;
displaying the vehicle surroundings by image data of the first image; and
displaying the vehicle by a 3D model of the vehicle, wherein the second image is displayed as a mirror surface of an outside mirror of the 3D model.

\* \* \* \* \*